(12) United States Patent
Sanguineti et al.

(10) Patent No.: US 8,730,815 B2
(45) Date of Patent: May 20, 2014

(54) INTERWORKING FOR OAM INFORMATION EXCHANGE

(75) Inventors: Antonella Sanguineti, Chiavari (IT); Riccardo Martinotti, Savona (IT); Raoul Fiorone, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 251 days.

(21) Appl. No.: 13/095,046

(22) Filed: Apr. 27, 2011

(65) Prior Publication Data

US 2012/0155283 A1 Jun. 21, 2012

Related U.S. Application Data

(60) Provisional application No. 61/424,393, filed on Dec. 17, 2010.

(30) Foreign Application Priority Data

Feb. 21, 2011 (EP) ..................................... 11155151

(51) Int. Cl.
*G01R 31/08* (2006.01)

(52) U.S. Cl.
USPC ....................................... 370/236.2; 370/467

(58) Field of Classification Search
USPC ........... 370/235, 236.2, 241.1, 242, 465, 466, 370/467, 243, 244, 245
See application file for complete search history.

(56) References Cited

U.S. PATENT DOCUMENTS

| | | | |
|---|---|---|---|
| 6,538,987 B1 * | 3/2003 | Cedrone et al. ................ 370/216 |
| 6,636,531 B1 * | 10/2003 | Nakashima et al. .......... 370/505 |
| 7,012,933 B2 * | 3/2006 | Mark et al. .................... 370/487 |
| 7,092,361 B2 * | 8/2006 | Puppa et al. ................... 370/242 |
| 7,787,461 B2 * | 8/2010 | Ciavaglia et al. ............. 370/392 |
| 7,808,914 B2 * | 10/2010 | Li ................................ 370/241.1 |
| 7,961,737 B2 * | 6/2011 | Ge et al. ..................... 370/395.53 |
| 8,036,211 B1 * | 10/2011 | Leeder et al. ................. 370/353 |
| 2006/0039382 A1 * | 2/2006 | Hansen et al. ........... 370/395.51 |
| 2008/0285466 A1 * | 11/2008 | Salam et al. ............... 370/241.1 |
| 2011/0299529 A1 * | 12/2011 | Olsson et al. ................ 370/390 |
| 2012/0026900 A1 * | 2/2012 | Chandrasekaran et al. .. 370/252 |

OTHER PUBLICATIONS

RFC 3031, Rosen et al, "Multiprotocol Label Switching Architecture", Jan. 2001.
RFC 3032, Rosen et al, "MPLS Label Stack Encoding", Jan. 2001.

(Continued)

*Primary Examiner* — Ricky Ngo
*Assistant Examiner* — Christine Ng
(74) *Attorney, Agent, or Firm* — Nixon & Vanderhye, P.C.

(57) ABSTRACT

A node (110) for an MPLS telecommunications network has interfaces (100) for OAM information exchange relating to a path for data traffic, between first and second other nodes each operating according to different OAM state machines for OAM information exchange. An OAM state machine mapper (120) maps the states of either of the different OAM state machines of the first and second other nodes into states recognized by the other of the different OAM state machines. OAM information exchange is according to either the first or the second OAM state machine and according to states mapped from the other of the OAM state machines, to support the path for data traffic through the node. By such mapping of the different states OAM information can be exchanged across corresponding boundaries and so paths no longer need to be terminated at the boundary to enable end to end operations.

24 Claims, 11 Drawing Sheets

(56) References Cited

OTHER PUBLICATIONS

RRC 5659, Bocci et al, "An Architecture for Multi-Segment Pseudowire Emulation Edge-to-Edge", Oct. 2009.
RFC 5860, Vigoureau et al, "Requirements for Operations, Administration, and Maintenance (OAM) in MPLS Transport Networks", May 2010.
RFC 5885, Nadeau et al, "Bidirectional Forwarding Detection (BFD) for the Pseudowire Virtual Circuit Connectivity Verification (VCCV)", Jun. 2010.
MLS Working Group, Internet Draft, Niven-Jenkins et al, "MPLS-TP Requirements", Aug. 16, 2009.
MPLS Working Group, Internet Draft, Allen et al, "Proactive Connectivity Verification, Continuity Check and Remote Defect Indication for MPLS Transport Profile", Oct. 22, 2010.
MPLS Working Group, Internet Draft, Busi et al, "MPLS-TP OAM Based on Y.1731", Oct. 25, 2010.
Network Working Group, Internet Draft, Sprecher et al, "MPLS-TP OAM Analysis", Jul. 4, 2010.
Network Working Group, Internet Draft, Bryant et al, "MPLS-TP Linear Protection", Oct. 24, 2010.

* cited by examiner

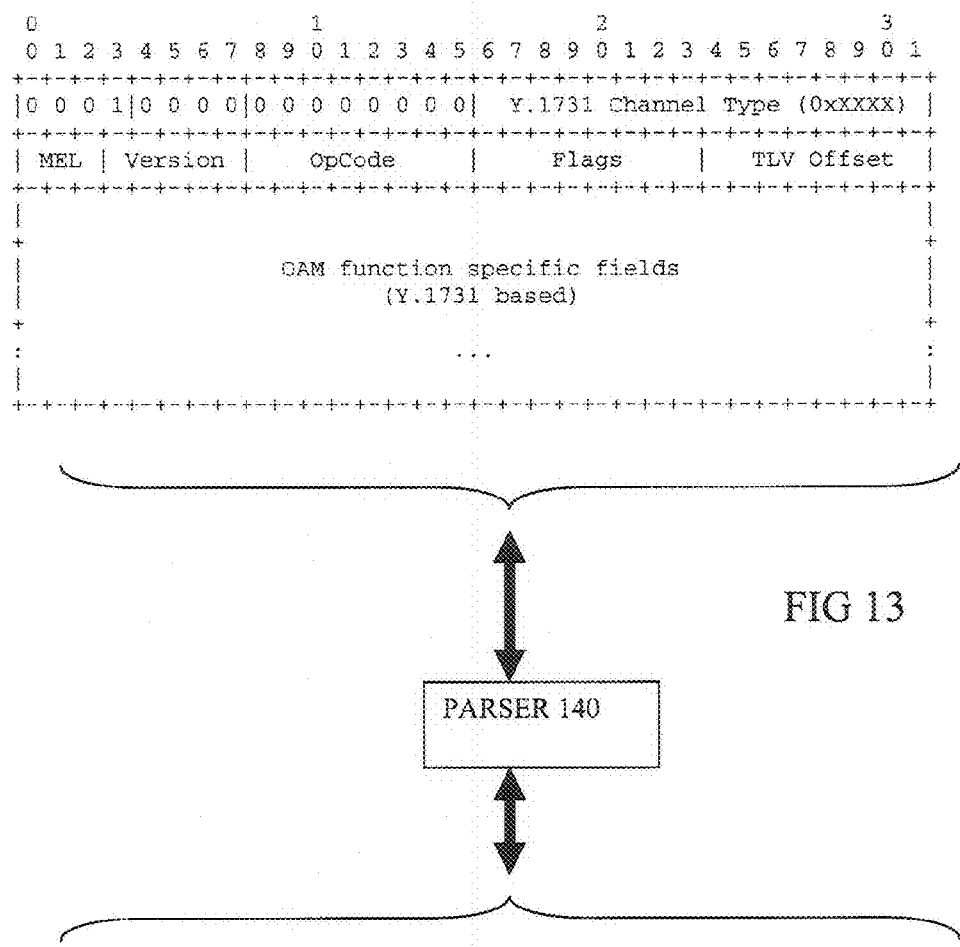
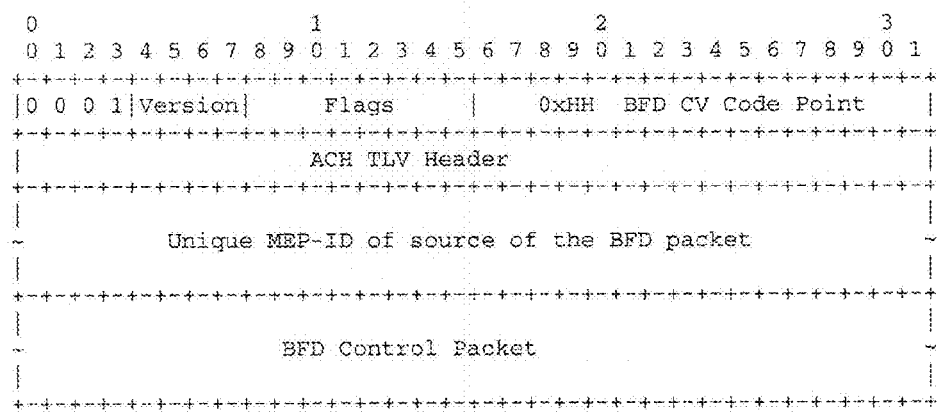
FIG 13

| 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|---|---|---|---|---|
| Vers | | | | Diag | | | | St | | P | F | C | A | D | M | Detect Mult | | | | | | | | | | | | | | | |
| My Discriminator ||||||||||||||||||||||||||||||||
| Your Discriminator ||||||||||||||||||||||||||||||||
| Desired Min Tx Interval ||||||||||||||||||||||||||||||||
| Required Min Rx Interval ||||||||||||||||||||||||||||||||
| Required Min Echo Rx Interval ||||||||||||||||||||||||||||||||

FIG 14

INTERWORKING FOR OAM INFORMATION EXCHANGE

This application claims the benefit of U.S. Provisional Application No. 61/424,393, filed on Dec. 17, 2010, and claims priority to EP Application No. 11155151.1, filed on Feb. 21, 2011, the entire contents of each of which are incorporated herein by reference.

TECHNICAL FIELD

This invention relates to nodes for MPLS telecommunications networks, to methods of operating such nodes, to methods of interfacing between MPLS-TS network nodes, and to corresponding computer programs for such methods.

BACKGROUND

Multi-Protocol Label Switching (MPLS) is a set of standards used in telecommunication networks for passing data packets from a node to other nodes. Each data packet has a label stack, on which forwarding decisions are made without the need to read or decode the rest of the packet.

Based on the existing MPLS forwarding plane, the Multi-Protocol Label Switching Transport Plane (MPLS-TP) aims to provide more functions relevant to transport level network requirements. One key area is the Operations, Administration and Maintenance (OAM) function set. This OAM function set is under standardization in the Internet Engineering Task Force (IETF). The OAM framework and requirements include functions such as Continuity Check (CC), Connectivity Verification (CV), Management Signals, etc.

MPLS-TP provides that the necessary OAM attributes (identifiers, timers, counters, etc.) are encoded in so called OAM frames that are in-band, that is multiplexed into the data flow. This means the OAM frames and data flow experience the same process in being forwarded from one node to another. The OAM frames are generated and received by Maintenance EndPoints (MEPs) at the endpoints of a connection; some of them (the on-demand) can be terminated at MIPs (Maintenance Intermediate Points). Currently, the MPLS-TP architecture consists of three layers: Pseudowire (PW), Label-Switched Path (LSP) Tunnel (connection) and Section (data link) layers. The MPLS-TP OAM can support all three layers.

Currently, several competing solutions of encoding the OAM parameters are proposed, though the same method of multiplexing the OAM frames into the data flows is used. An associated channel is defined to carry the OAM frames and other control/management frames. For PWs, these channels are identified and de-multiplexed using only the Generic Associated Channel Header (G-ACH). In the case of LSP tunnels and sections, an additional label, the Generic Association Channel Label (GAL) indicates the associated channels. At the egress side, the MEP detects and de-multiplexes the OAM frames based on these labels. However, if it is desired to include in a network different nodes with different and incompatible ways of handling OAM information exchange, then the paths will need to be terminated and the OAM information demultiplexed and transmitted separately to the incompatible node.

SUMMARY

An object of the invention is to provide improved apparatus or methods. According to a first aspect, the invention provides:

A node for an MPLS telecommunications network, the node having interfaces for OAM information exchange relating to a path for data traffic between first and second other nodes each operating according to different OAM state machines for OAM information exchange. The node also has an OAM state machine mapper arranged to map the states of either of the different OAM state machines of the first and second other nodes into states recognised by the other of the different OAM state machines. The node can use the interfaces to carry out the OAM information exchange between the first and second other nodes according to either the first or the second OAM state machine and according to states mapped from the other of the OAM state machines, to support the path for data traffic through the node.

By such mapping of the different states between OAM state machines of different standards, OAM information can be exchanged across corresponding boundaries and so paths no longer need to be terminated at the boundary and can have an ingress node operating according to one of the state machines and an egress node operating according to another of the state machines. This can help enable simpler operation of the network and increase flexibility to use nodes of different vendors, and thus reduce costs.

Another aspect of the invention provides a method of operating a telecommunications network by exchanging OAM information between MPLS nodes in the telecommunications network, the nodes each operating according to different OAM state machines. The method has steps of mapping the states of one of the different OAM state machines into states recognised by another of the different OAM state machines, and carrying out the exchanging of the OAM information between the nodes. The exchange is carried out according to the states of one of the OAM state machines and according to mapped states mapped from another of the different OAM state machines, to support a path for data traffic between the nodes.

Another aspect of the invention provides a method of interfacing between MPLS-TS network nodes operating according to different definitions for OAM PDU formats and for state machines for OAM information exchange, by translating OAM PDUs received in a format according to one of the definitions, into another format according to another of the definitions, and using a transcoding state machine to cooperate with the different OAM state machines defined for each of the network nodes to carry out OAM information exchange between the network nodes. This can support paths for data traffic having end points at the network nodes operating according to the different definitions.

Another aspect of the invention provides a computer readable storage medium having a stored program for execution by a processor for controlling a node for a communications network, to carry out a method as set out above.

Any additional features can be added to these aspects, or disclaimed from them, and some are described in more detail below. Any of the additional features can be combined together and combined with any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 13 shows a schematic view of a parsing operation to translate a format of a PDU, FIG. 14 shows a format of the BFD Control Packet.

DETAILED DESCRIPTION

Figure 1:
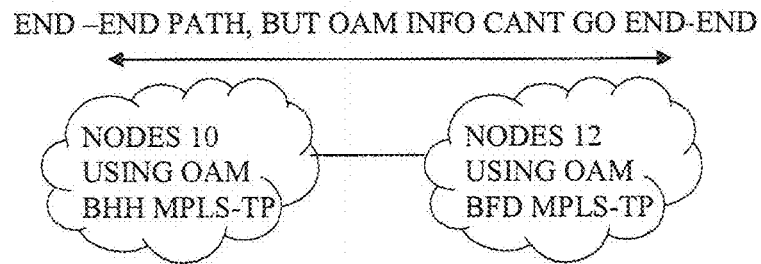
FIGS. 1 and 2 show schematic views of prior art networks.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Definitions

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to programs or software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

| Abbreviations | |
|---|---|
| BFD | Bidirectional Forwarding Detection |
| BHH | Busi, Helvoort, Hee |
| IETF | Internet Engineering Task Force |
| IP | Internet Protocol |
| LSP | Label Switched Path |
| MEP | Maintenance End Point |
| MIP | Maintenance Intermediate Point |

| Abbreviations —continued | |
|---|---|
| MPLS | Multi Protocol Label Switching |
| MPLS-TP | MPLS-Transport Profile |
| OAM | Operation, Administration and Maintenance |
| PW | Pseudo Wire |
| RFC | Request For Comment |

REFERENCES

IETF RFC 3031—"Multiprotocol Label Switching Architecture"

IETF RFC 3032—"MPLS Label Stack Encoding"

IETF RFC 5659—"An Architecture for Multi-Segment Pseudowire Emulation Edge-to-Edge"

IETF RFC 5860—"Requirements for Operations, Administration, and Maintenance (OAM) in MPLS Transport Networks"

IETF RFC 5885—"Bidirectional Forwarding Detection (BFD) for the Pseudowire Virtual Circuit Connectivity Verification (VCCV)"

IETF draft-ietf-mpls-tp-requirements—"MPLS-TP Requirements"

IETF draft-ietf-mpls-tp-cc-cv-rdi—"Proactive Connectivity Verification, Continuity Check and Remote Defect indication for MPLS Transport Profile"

IETF draft-bhh-mpls-tp-oam-y1731—"MPLS-TP OAM based on Y.1731"

IETF draft-ietf-mpls-tp-oam-analysis—"MPLS-TP OAM Analysis"

IETF draft-ietf-mpls-tp-linear-protection—"MPLS-TP Linear Protection"

Figure 2:
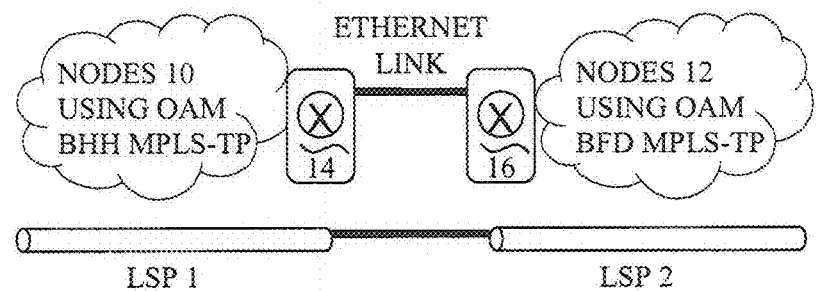

Introduction, FIGS. 1, 2

By way of introduction to the embodiments, some issues with conventional designs will be explained. The standardization activity on MPLS TP is in a situation where one solution to derive MPLS TP from the IP/MPLS suite has been approved by IETF, but still not yet ratified by the ITU-T. This version of MPLS TP will be called 'BFD based' as it uses BFD as reference base for OAM.

On the other side, as the standardization activity on the 'BFD based' MPLS TP is delaying its finalization, a group of vendors and some big operators have submitted a new contribution to IETF to implement MPLS TP by adopting the OAM already defined for the Ethernet, that is ITU-T Y.1731. This draft is called draft-bhh-mpls-tp-oam-y1731 and will be referenced as 'BHH' MPLS TP.

At current state, it is not clear what whether or not the BHH MPLS TP will be approved as part of the MPLS TP standard suite, but whether it happens or not, it is likely that vendors will anyhow either implement one of the two choices or both. From a network perspective this could lead to a situation where big networks are built with products by different vendors, and may present islands of BHH or BFD MPLS TP variants.

A possible situation could be the one shown in FIG. 1, where up to now there is no solution or end-to-end OAM in MPLS-TP layer. This figure shows an island of nodes 10 using BHH based OAM, and an island of nodes 12 using BFD based OAM. Currently there is a big standardization effort within IETF and ITU to agree a suite of protocols based on MPLS that is suitable for transport networks. This suite of protocols is called MPLS TP. The assumption for MPLS TP is that its data plane is the same as MPLS, while OAM is as compatible with MPLS as possible, while introducing new functionality that fits with transport networks' needs.

Most of the standardization discussions take place on OAM, as this is a key functionality and a big differentiator of any technology. Following the requirements above, IETF is drafting the set of OAM tools described for instance, in draft-ietf-mpls-tp-cc-cv-rdi. According to this standard the Proactive CC, CV, RDI PDU are based on BFD protocol, simply encapsulated into MPLS TP OAM. The state machine for the OAM processing is as per RFC 5880, with minor modifications. This version of OAM aims at interworking with already existing and widespread MPLS. On the other hand another proposal has been submitted, included in draft-bhh-mpls-tp-oam-y1731 that makes use of ITU-T Y.1731 PDUs and state machine, to achieve the same functionalities (Proactive CC, CV, RDI).

BFD-based and BHH-based MPLS TP OAM are not compatible (e.g. PDU format and state protocol state machines are different), so any interconnection between networks with these two kinds of MPLS TP OAM needs to have client layer hand-off (e.g. Ethernet), as shown in FIG. 2. This figure shows nodes 10 using BHH-based MPLS-TP OAM and a termination of the LSP1 at node 14 where it is coupled by the Ethernet link to node 16 which couples the Ethernet link to LSP 2 which extends amongst the nodes 12 using BFD-based MPLS TP OAM.

This interconnection mode is at the detriment of the end-to-end view for the MPLS tunnels (LSPs) and PW, thus making the manageability of the network more complex. In fact assuming that both LSP and PW of the individual networks are based on BFD and BHH respectively, the network cannot be designed with end-to-end LSPs or PWs, but the interconnection requires the termination of both LSP and PW at each side of the connecting points; so the current situation allows for interworking only at client level. Within a network managed by a single operator, having multiple different technologies carrying the same services increases OPEX significantly.
Introduction to Features of Embodiments of the Invention The embodiments described involve addressing at least some of these problems by proposing an interworking function between two flavours of the MPLS TP technologies, either the particular flavours currently being discussed within the Joint Working Team, between IETF and ITU, or any others that might arise in the future that pose similar problems. Some embodiments have nodes able to provide interworking between BFD based and BHH based MPLS TP OAM implementations. This interworking function can relate to:

OAM message format at LSP/PW level
OAM state machines at LSP/PW level
OAM consequential actions at LSP/PW level This interworking function can be implemented in a node or any network entity NE on the paths.

Some advantages of such an end-to-end solution are: Homogeneous technologies, End-to-end performance monitoring, End-to-end supervision, and End-to-end consequential actions, end-to-end protection.
Some Additional Features of Embodiments Embodiments can have any features added to those of any of the aspects set out in the summary section above, and some are set out below. The mapper can have a mapping state machine comprising a superset of the states of the different OAM state machines. This is one way of implementing the mapper, though others are conceivable.

The different state machines can have differing transmission rates for the OAM information exchange in at least one of their states, and the node can be arranged to change a rate of OAM messages to compensate for the differing transmission rates, under the control of the mapper. This can provide further compatibility benefits.

The first and second nodes can have differing formats for data units carrying the OAM messages in at least one of their states, and the node can have a parser for translation of data units between the different formats. This can help overcome further differences between the nodes.

The node can be able to set up paths in a hierarchy of layers such that a higher layer path uses capacity of one or more lower layer paths, and the node having an independent mapper for each of the paths at the different layers. This can help maintain compatibility in more complex network configurations.

The OAM information exchange can be in-band, the interfaces comprising an OAM demux for distinguishing and reading in-band OAM messages from data traffic sent from the first of the other nodes operating according to a first of the OAM state machines, and an OAM muxer for adding outgoing OAM messages to data traffic to the second other node under the control of the mapper. This is one preferred way of implementing the node.

The node can be arranged to handle paths in the form of label switched paths and paths in the form of pseudo-wires. These are two common types of path in such networks.

The different state machines can conform to the BHH MPLS TP variant, and the BFD MPLS TP variant respectively. These are potentially commercially valuable ways of implementing OAM state machines.

The OAM information can comprise any of the following: path supervision information, automatic protection switching information, and performance monitoring information for example. These are some of the possible categories of information being exchanged to support the paths.

The mapping state machine can be arranged to change its state according to any of: changes in states of the state machines at the other nodes, an input from a network operator, a fail indication, and an expiry of a timer for example. These are some of the possible triggers for state changes, which the node should be able to handle without causing incompatibilities between the different state machines.

The interworking function can have: a parser for parsing from the BFD-based OAM and APS PDUs to BHH OAM and related APS (e.g. according to draft-zulr-mpls-tp-linear-protection-switching-01) PDUs and vice versa, and a 'translation function' able to align the BFD based OAM state machine into BHH OAM state machine.

These two functions can be applied to either LSPs or PW and ensure that from an operator perspective there is no discontinuity between the two different MPLS-TP domains. As an example consider the relevance of having end-to-end LSP performances at LSP level in a single operator network built with different MPLS TP islands. Commissioning of the two network islands is different but monitoring and protection is end-to-end and consistent.

According to some embodiments of the invention, there is provided a node having an interface for coupling between MPLS-TS network nodes operating according to different definitions for PDU formats and for state machines for OAM information exchange, the node having a parser for translation of PDUs received in a format according to one of the definitions, into another format according to another of the definitions for a node to which the PDU is destined, and the node also having a transcoding state machine, operable to cooperate with the different OAM state machines defined for each of the network nodes to enable OAM information exchange between the network nodes via the interface, to support paths for data traffic having end points at the network nodes.

By having the interface match the different states between OAM state machines of the different standards, LSPs can be set up via the interface and having an ingress node operating according to one of the definitions and an egress node operating according to another of the definitions.

Other embodiments of the invention provide a method of interfacing between MPLS-TS network nodes operating according to different definitions for OAM PDU formats and for state machines for OAM information exchange, the method having the steps of translating OAM PDUs received in a format according to one of the definitions, into another format according to another of the definitions, and using a transcoding state machine to cooperate with the different OAM state machines defined for each of the network nodes to carry out OAM information exchange between the network nodes, to support paths for data traffic having end points at the network nodes operating according to the different definitions.

The method can have the step of operating at a client layer using the same definitions end to end, while applying the interfacing at an LSP layer to use different definitions at each end.

The method can have the step of applying the interfacing at both an LSP layer and a client layer to use different definitions at each end.

The method can have the step of carrying out OAM PDU termination, followed by OAM PDU generation or suppression according to differences in periodicity of OAM PDUs in the different definitions.

The method can have the step of using a mapping table to map between events that trigger state changes.

The method can be used where the client layer has multiple segments, and the method can have the step of propagating fault information in case of failure in one of the segments, or of remapping performance information from one segment to another.

The OAM PDU can include APS (automatic protection switching) information, loss measurement information, alarm indication signals, delay measurement information, amongst others.

The OAM state machines can comprise BFD (Bidirectional forwarding Detection) or BHH types or another different type.

Figure 3:
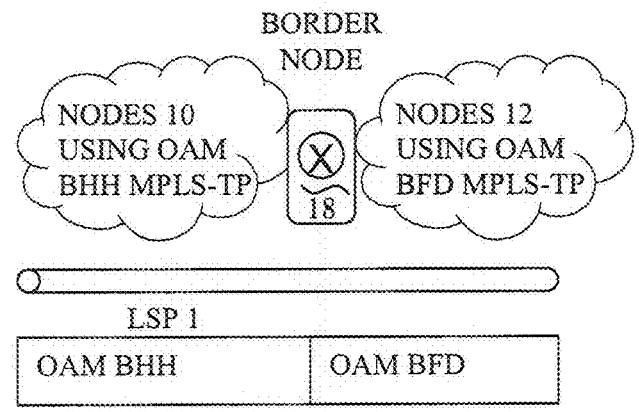
FIGS. 3 to 5 show schematic views of nodes according to embodiments of the invention.
Figure 4:
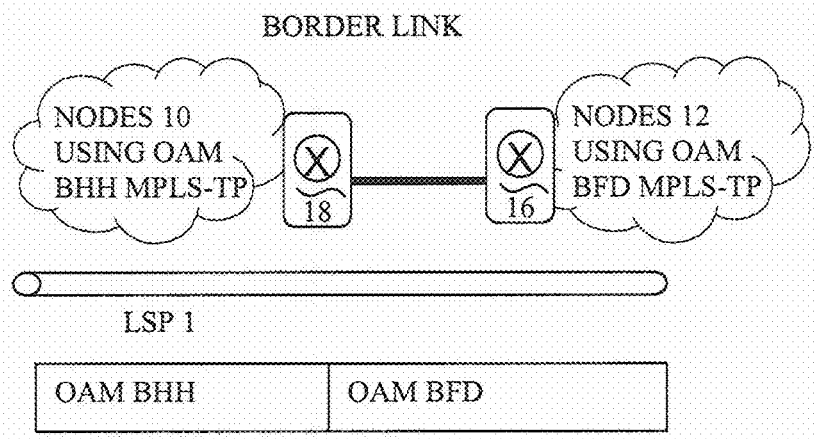
Figure 5:
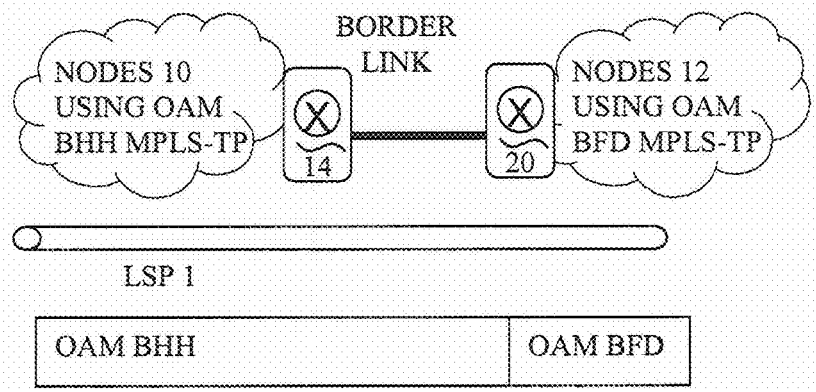

FIGS. 3 to 5, Embodiments of the Invention

FIGS. 3 to 5 show schematic views of embodiments of the invention, and show that the interworking can be arranged as either a border node (see FIG. 3) or border link (see FIGS. 4 and 5). In both cases, the BFD-BHH IWF shall ensure that the entity to which it applies (e.g. LSP or PW) can ensure end-to-end connectivity, OAM and protection, despite crossing the technology boundary.

In FIG. 3, a border node 18 is at the edge of both islands of nodes, the island of nodes 10 using BHH based OAM, and the island of nodes 12 using BFD based OAM. This means an end to end path can be set up across the boundary, shown by LSP 1, and along the path one part has nodes using BHH based OAM, and the other part has nodes using BFD based OAM.

In FIGS. 4 and 5, similar schemes are shown to that of FIG. 3, except that there are two boundary nodes, and a border link. In FIG. 4 the interworking takes place in node 18 at the edge of the BHH island. In FIG. 5, the interworking takes place at the node 20 at the edge of the BFD island.

As the IWF can be implemented in a single equipment, embodiments of this invention may be applied to any of the scenarios of FIG. 3, 4 or 5. In FIG. 5, the IWF is shown at either end of a border link. For the purposes of description only, the border node is used in the figures from this point on, though any of the examples can of course be adapted to be distributed over two nodes.

Figure 6:
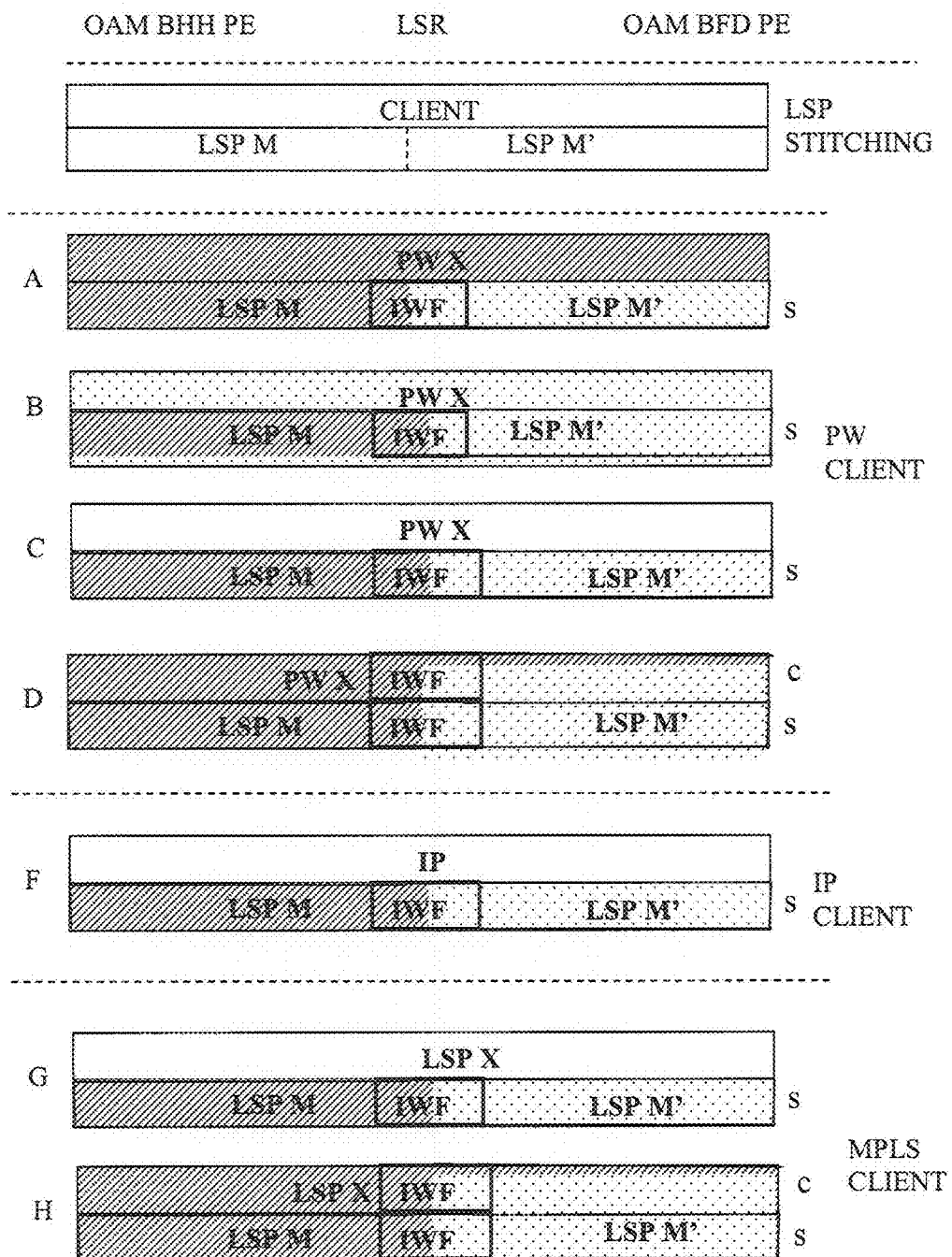
FIGS. 6A to 6H show schematic views of various arrangements of client and lower layers having interworking functions in nodes according to embodiments of the invention, FIG. 7. shows a schematic view of state machines and state transitions for use in a node or nodes according to an embodiment of the invention.

FIG. 6, Application to Different Layers According to Embodiments

Embodiments of this invention can be implemented as an IWF that can be applied to either LSP or PW or both, based on the specific network layout and the kind of the client layer.

FIG. 6 shows some of the possible examples of its wide applicability. As an example, cases A), B) and C) are show the application of the IWF at LSP level, where stitching occurs; the client layer, the PW, runs end-to-end with either BFD or BHH or another different OAM. Case D) is the option where an IWF applies to both LSP and PW; in fact each MPLS TP domain is implemented with its own technology, so translation is need for both layers. Embodiments of this invention can also apply where there is a client IP layer, and in multi-segment PW or when MPLS stacking occurs (cases G and H) with either a single LSP for the client layer or LSPs of different OAM types as in case H.

Figure 7:
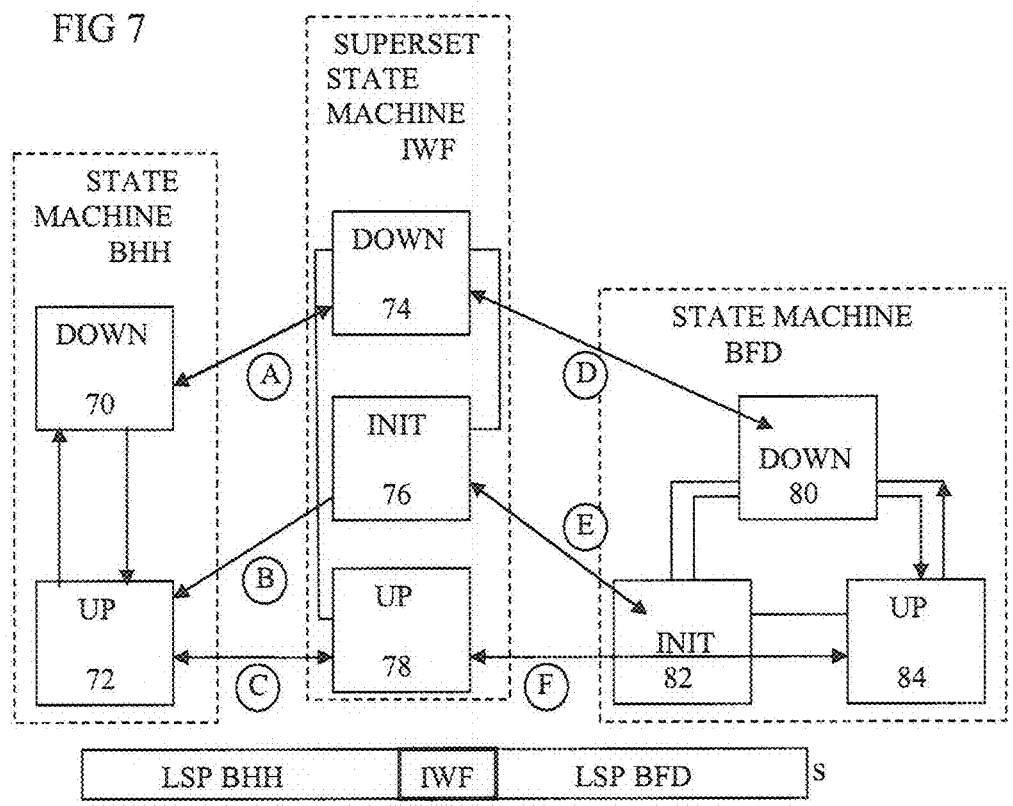

FIG. 7, State Machine View

One of the key functions of some embodiments is the translation between the BHH and BFD state machines. The mapping between states can be implemented by using a third IWF state machine that includes the superset of the states of both.

FIG. 7 shows an example of such a superset IWF state machine relative to the BHH and BFD state machines. A basic principle is that the IWF implements a 'transcoding' state machine, able to match the different states between the BFD and the BHH OAM state machines. There can be MEP and MIPS in the node or in neighbouring nodes working with BHH OAM and BFD OAM respectively. The BHH state machine can only be in one of the two states—UP 72 and DOWN 70; in the UP state they send and receive OAM PDUs every 3.3 ms, while in the DOWN state, they send PDUs each 3.3.ms, but do not detect any remote OAM (e.g due to fault cause). In both states there are events that trigger the state switching.

The MEPs and MIPs running BFD OAM can be in one of the three states—INIT 82, UP 84 and DOWN 80. With respect to the previous state machine, the INIT state sends OAM messages with higher configurable period, and then switches to the 3.3.ms in the UP state. The switching between states is triggered by timer expirations, events and administrative down action. The superset state machine has a DOWN state 74, an INIT state 76 and an UP state 78 which each are compatible with the corresponding states in the BHH and BFD state machines.

The BHH state machine may propagate its DOWN state to the superset IWF and vice versa as shown by A. The BHH state machine may propagate its UP state to the superset IWF and vice versa as shown by C. The INIT state of the superset may be propagated to become the UP state in the BHH state machine as shown by B. The BFD state machine may propagate its DOWN state to the superset IWF and vice versa as shown by D. The BFD state machine may propagate its UP state to the superset IWF and vice versa as shown by F. The INIT state of the superset may be propagated to the BFD state machine and vice versa as shown by E.

Figure 8:
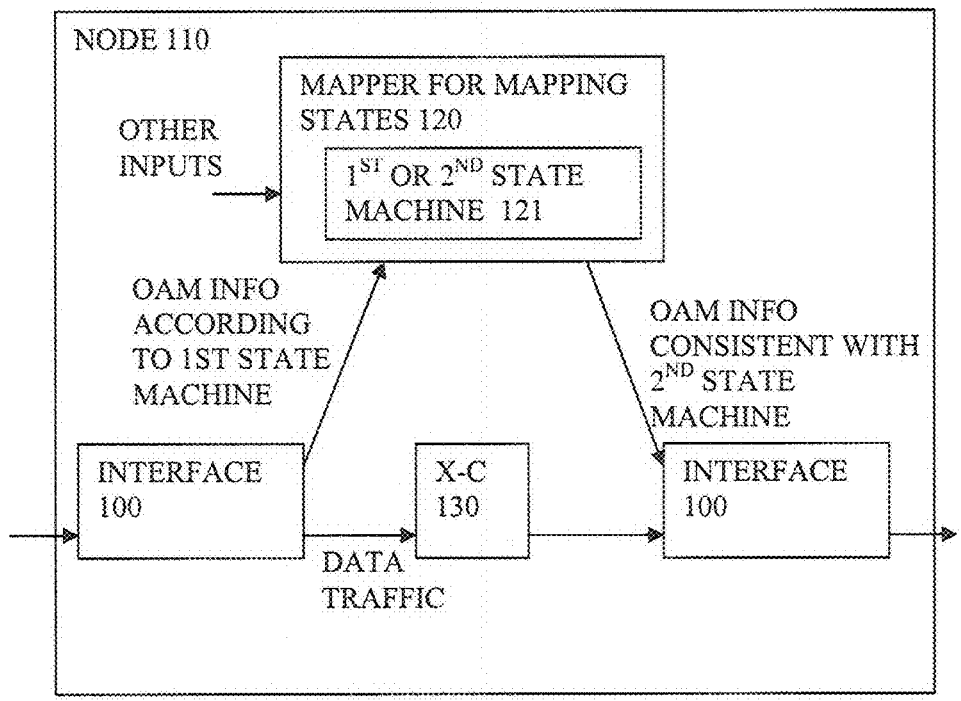
FIGS. 8 to 10 show schematic views of nodes according to embodiments of the invention.
Figure 9:
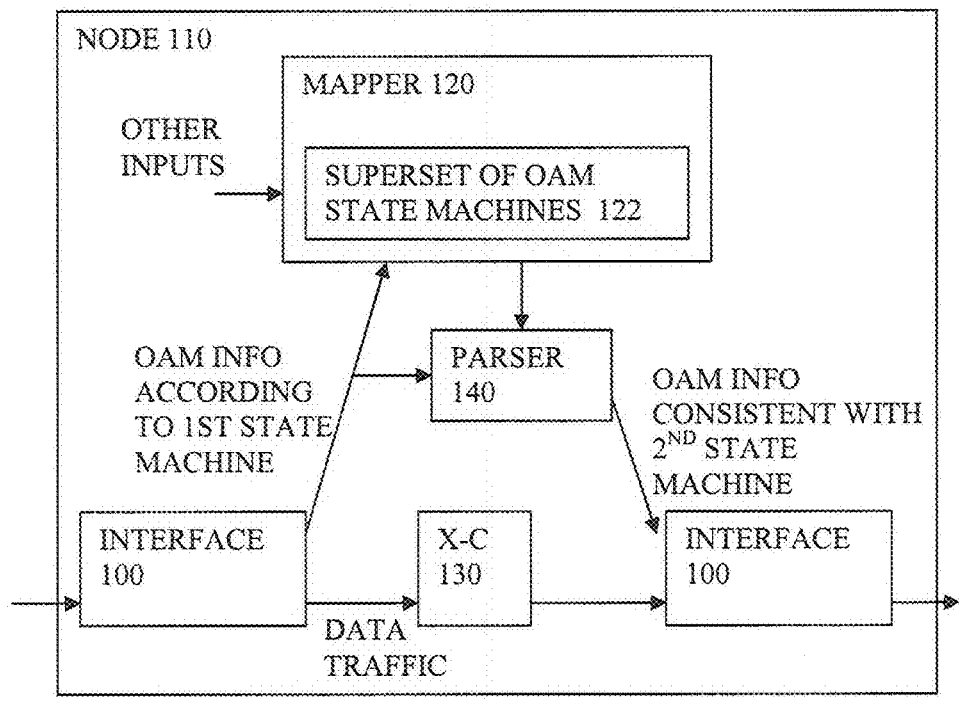
Figure 10:
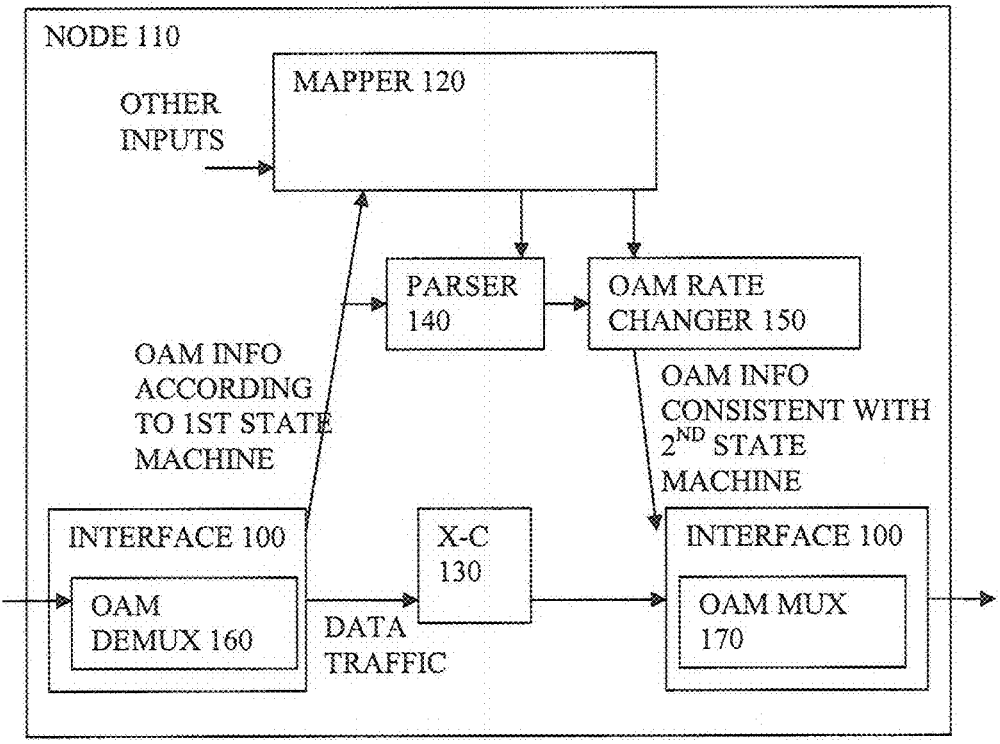

FIGS. 8 to 10, Schematic Views of Nodes According to Embodiments

FIG. 8 shows a schematic view of a node 110 according to an embodiment and arranged to carry out an interworking function IWF to allow end to end OAM information exchange. It has an interface 100 which handles working data traffic and OAM information to and from a neighbouring node which operates according to a $1^{st}$ state machine for OAM information exchange. Another interface 100 handles working data traffic and OAM information to and from a neighbouring node which operates according to a 2nd state machine for OAM information exchange. A switch in the form of a cross connect 130 is shown for handling the data traffic, while the OAM information is separated by the interface and processed by an OAM state machine which can be in the form of a $1^{st}$ or $2^{nd}$ OAM state machine 121 and a mapper 120 for mapping states of the other of the OAM state machines so that the node can deal with OAM info consistent with the $2^{nd}$ OAM state machine as well as dealing with the OAM info consistent with the $1^{st}$ OAM state machine. This can enable interworking between nodes using such different OAM state machines, to enable end to end OAM information exchange. Although the arrows in this figure suggest a one directional flow of the OAM information, in a typical case, it can be in both directions. Other inputs can be used by the mapper to determine the correct state or to determine what actions to undertake in view of the current state.

FIG. 9 shows a schematic view of a node similar to that of FIG. 8, in this case, the mapper has a state machine which is a superset 122 of the different OAM state machines to enable it to act as expected in OAM information exchange with neighbouring nodes using the $1^{st}$ and the $2^{nd}$ OAM state machines. Also shown is a parser 140 for converting a format of packets used for the OAM information exchange, under the control of the mapper 120.

FIG. 10 shows a schematic view of a node similar to that of FIG. 9, in this case, the parser is coupled to an OAM rate changer 150 arranged to change a rate of the information exchange, under the control of the mapper and thus dependent on the state of the $1^{st}$ or second state machine, so that inconsistencies in the rates called for by the different state machines can be handled. This can mean inserting additional packets or removing some packets, and delaying others for example.

Figure 11:
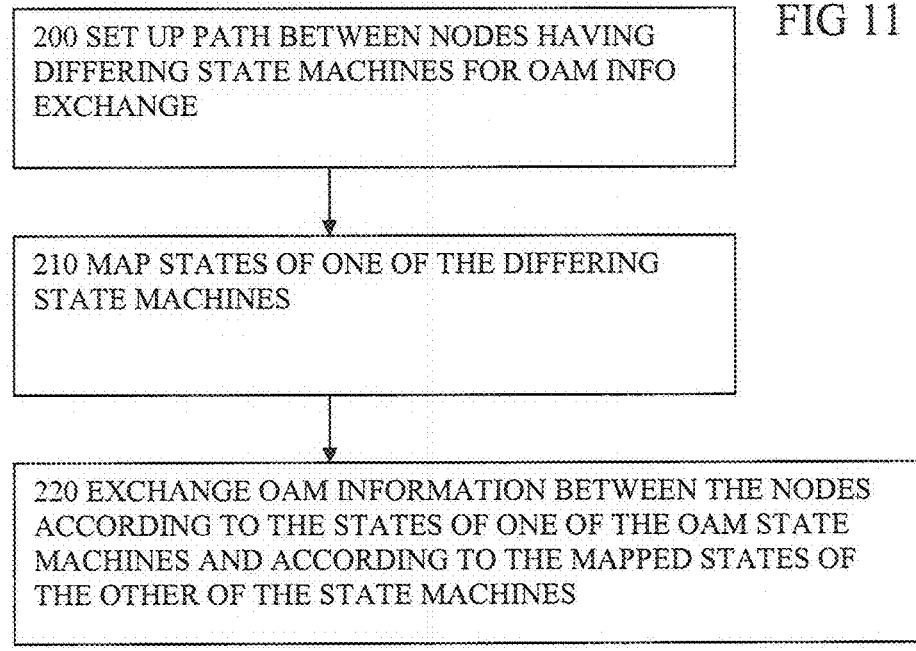
FIGS. 11 and 12 show steps in operation according to embodiments of the invention.
Figure 12:
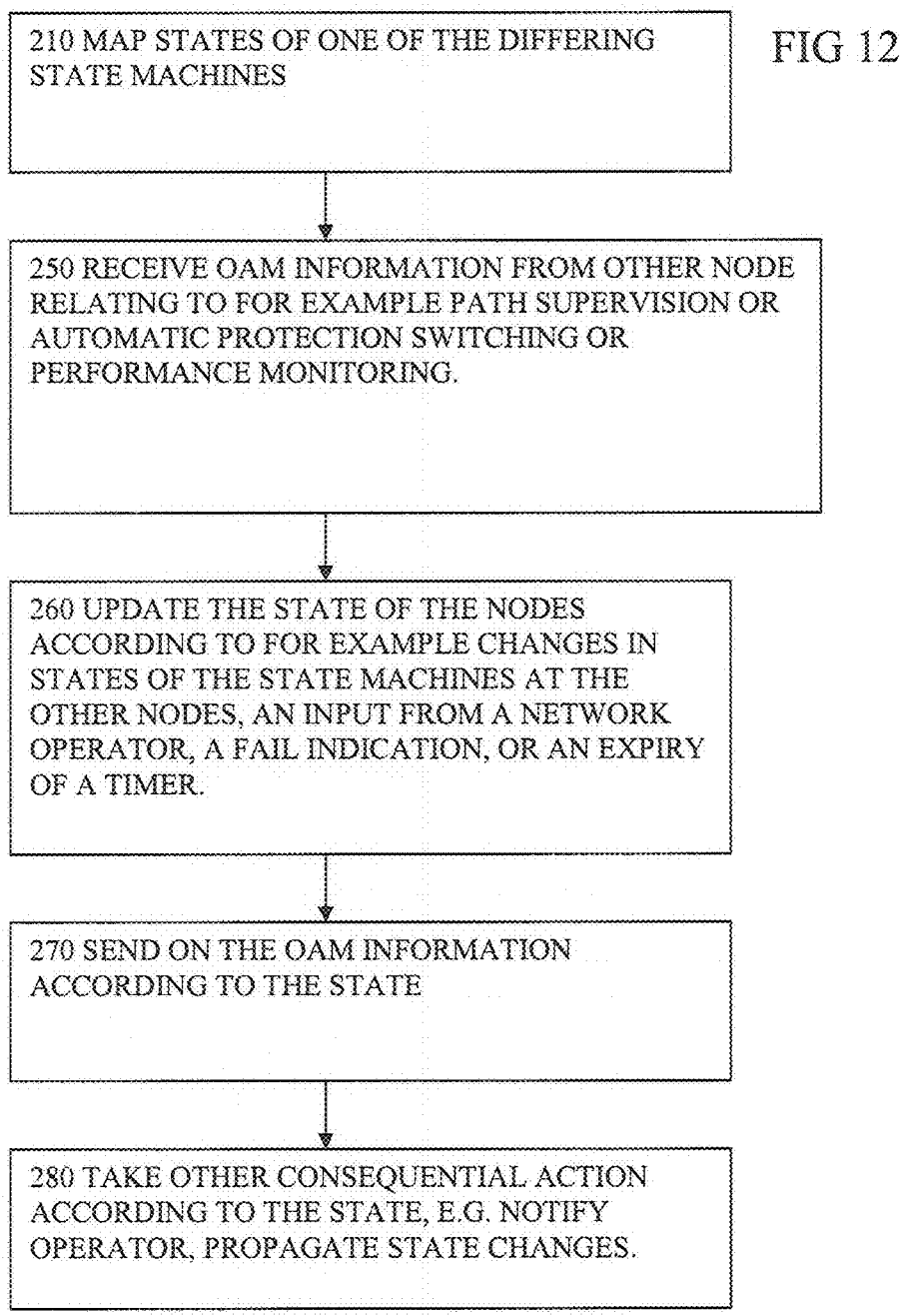

FIGS. 11, 12, Methods of Operation According to Embodiments

FIG. 11 shows some of the steps involved in operation of an embodiment of the invention. At step 200, a path for data traffic is set up between nodes having differing state machines for OAM information exchange. At step 210, at a node at the boundary, states of at least one of the OAM state machines are mapped to a corresponding state in the other of the differing OAM state machines. At step 220, OAM information is exchanged along the path and at the boundary, the OAM information is passed according to the state of one of the OAM state machines and according to the mapped state of the other of the OAM state machines.

FIG. 12 shows some of the steps involved in operation of another embodiment of the invention. After the path is set up, at step 210, at a node at the boundary, states of at least one of the OAM state machines are mapped to a corresponding state in the other of the differing OAM state machines. At step 250, OAM information is received from another node relating to for example path supervision, or automatic protection switching or performance monitoring. At step 260, a state of the state machine at the node is updated according to for example changes in states at other nodes, or by input from a network operator, or a fail indication, or expiry of a timer. At step 270, the node sends on the received OAM information, depending on the state of the state machine. At step 280 the node may take other consequential action depending on the state, for example to notify an operator, or propagate state changes.

A novel feature of some embodiments is a translation function which in some cases at least implies some or all of the following actions:

OAM PDU termination (all cases)

OAM PDU generation or suppression to cope with different periodicity for OAM state (case (E) and (D) of FIG. 6)

Mapping table between events that trigger state changes (all cases)

Propagating fault information in case of failure in one of the segments

Remapping of performance monitoring information from one segment to the other

Another novel feature of some embodiments is the PDU translation. For this activity a simple parser 140 is needed. An example is shown in FIG. 13. FIG. 13 shows a schematic view of a PDU translation function carried out by the parser 140, to translate between different PDU formats for the particular example of interworking between BFD-based OAM information exchange and BHH-based OAM information exchange. The BHH version of a control packet is shown in the top half, taken from FIG. 1 of draft-bhh-mpls-tp-oam-y1731-06.txt.

The BFD version is shown in the lower half of FIG. 13, taken from FIG. 3 of draft-ietf-mpls-tp-bfd-cc-cv-00.

A new translation table can be defined for the parser, which has the relationship between the information carried on one side and the other or the relationship in both directions.

This Translation table can have the following format:

| IWF Parameter | BFD Parameter | BHH Parameter |
|---|---|---|
| <BFD only parameter x> | <parameter x> | N/A |
| <BHH only parameter y> | N/A | <parameter y> |
| <common parameter z> | <parameter z> | <parameter z> |

MPLS-TP BFD OAM uses the BFD control packet as the payload. The format of the BFD Control Packet is as shown in FIG. 14.

Figure 15:
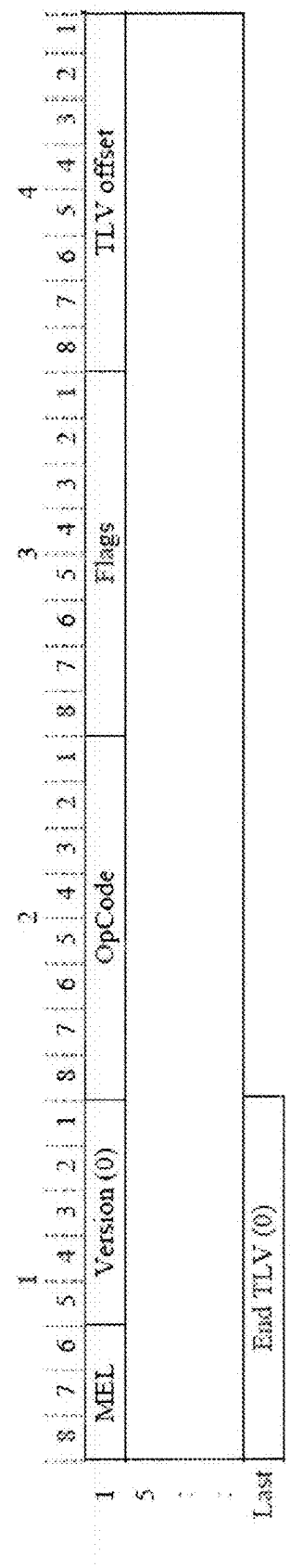
FIG. 15 shows a format used by BHH OAM for the OAM PDU format defined by ITU-T Y.1731.

MPLS-TP BHH OAM uses the OAM PDU format defined by Y.1731. The formal of the common OAM PDU is as shown in FIG. 15.

The two functions described above can apply also to the APS protocols, with exactly the same mechanism. The two functions ensure that the instance to which they are applied (e.g. LSP or PW) are perceived as end-to-end despite a technology shift and the border node or border link.

Some advantages of the end-to-end solution enabled by such OAM interworking are as follows:

The end-to-end view of the transport resources of an MPLS TP network, despite different MPLS TP OAM flavors in different regions. This can be a likely situation as both BHH and BFD standards are progressing and are appealing at different vendors. It may happen that that a single operator network is made of different islands interconnected. Reduced OPEX may result as it allows the operator not to be linked to the vendors for a specific technology. It allows for end-to-end interconnection of an BHH MPLS TP network with IP/MPLS network. It helps enable the applicability of a control plane through non homogeneous networks. It enables end-to-end performance monitoring, end-to-end supervision, end-to-end consequential actions, and end-to-end protection schemes. All of these can help enable reduced CAPEX.

Other variations and embodiments can be envisaged within the claims.

The invention claimed is:

1. A node for an MPLS communications network, the node comprising:
   at least one interface for OAM information exchange relating to a path for data traffic between first and second other nodes each having a different OAM state machine configured to operate according to a respective variant of MPLS for OAM information exchange; and
   an OAM state machine mapper including a superset state machine configured to map states of either of the different OAM state machines into states recognised by the other of the different OAM state machines,
   the node being arranged to use the at least one interface to carry out the OAM information exchange between the first and second other nodes according to one of the different OAM state machines and according to states mapped from the other of the different OAM state machines, to support the path for data traffic through the node, the node being arranged further to modify an OAM message from the first other node to the second other node by changing, in the OAM message, a parameter specified according to the OAM state machine of the first other node to a parameter specified according to the OAM state machine of the second other node.

2. The node of claim 1, wherein the OAM state machine mapper comprises a mapping state machine comprising a superset of the states of the different OAM state machines.

3. The node of claim 1, wherein the different state machines have differing transmission rates for the OAM information exchange in at least one of their states, and the node being arranged to change a rate of OAM messages to compensate for the differing transmission rates, under control of the OAM state machine mapper.

4. The node of claim 1, the first and second nodes having differing formats for data units carrying OAM messages in at least one of their states, and the node having a parser configured to translate data units between the differing formats.

5. The node of claim 1, the node being configured to set up paths in a hierarchy of layers such that a higher layer path uses capacity of one or more lower layer paths, and the node having an independent OAM state machine mapper for each of the paths at respective layers in the hierarchy.

6. The node of claim 1, the OAM information exchange being in-band, the at least one interface comprising an OAM demux for distinguishing and reading in-band OAM messages from data traffic sent from the first of the other nodes operating according to a first of the different OAM state machines, and an OAM muxer for adding outgoing OAM messages to data traffic to the second other node under control of the OAM state machine mapper.

7. The node of claim 1, the node being configured for paths in the form of label switched paths and paths in the form of pseudo-wires.

8. The node of claim 1, the different OAM state machines conforming to the BHH MPLS TP variant, and the BFD MPLS TP variant respectively.

9. The node of claim 1, the OAM information exchange comprising exchanging any of the following: path supervision information, automatic protection switching information, and performance monitoring information.

10. The node of claim 2, the mapping state machine being arranged to change its state according to any of: changes in states of the state machines at the other nodes, an input from a network operator, a fail indication, and an expiry of a timer.

11. A method of operating a telecommunications network by exchanging OAM information between MPLS nodes in the telecommunications network, the nodes each having a different OAM state machine configured to operate according to a respective variant of MPLS to exchange OAM information, the method comprising:
   mapping, using a superset state machine, states of one of the different OAM state machines into states recognised by another of the different OAM state machines,
   performing the exchanging of the OAM information between the nodes according to states of one of the different OAM state machines and according to states mapped from another of the different OAM state machines, to support a path for data traffic between the nodes, and
   modifying an OAM message from a first node to a second node by changing, in the OAM message, a parameter specified according to the OAM state machine of the first node to a parameter specified according to the OAM state machine of the second node.

12. The method of claim 11, wherein the mapping comprises using a mapping state machine having a superset of states of the different OAM state machines.

13. The method of claim 11, wherein the different OAM state machines have differing transmission rates for the OAM information exchange in at least one of their states, and the method further comprising changing a rate of OAM messages to compensate for the differing transmission rates.

14. The method of claim 11, the nodes having differing formats for data units carrying the OAM messages in at least one of their states, and the method further comprising translating data units between the differing formats.

15. The method of claim 11, the nodes being able to set up paths in a hierarchy of layers such that a higher layer path uses capacity of one or more lower layer paths, and the method further comprising using an independent mapper for each of the paths at respective layers in the hierarchy.

16. The method of claim 11, the exchanging OAM information being in-band, the method further comprising distinguishing and reading in-band OAM messages from data traffic sent from the first of the nodes operating according to a first of the different OAM state machines, and adding outgoing OAM messages to data traffic for transmission to a second of the nodes.

17. The method of claim 11, the different OAM state machines conforming to the BHH MPLS TP variant, and the BFD MPLS TP variant respectively.

18. The method of claim 12, further comprising changing the state of the mapping state machine according to any of: changes in states of the state machines at the other nodes, an input from a network operator, a fail indication, and an expiry of a timer.

19. A method of interfacing between MPLS-TS network nodes operating according to different definitions for OAM PDU formats and for OAM state machines configured to operate according to respective variants of MPLS for OAM information exchange, the method comprising:
   translating OAM PDUs received in a format according to one of the definitions, into another format according to another of the definitions,
   using a transcoding OAM state machine including a superset state machine at one of the network nodes to cooperate with the different OAM state machines defined for each of the other network nodes to carry out OAM information exchange between the network nodes, to support paths for data traffic having end points at the network nodes operating according to the different definitions, and
   modifying an OAM message from a first other node to a second other node by changing, in the OAM message, a parameter specified according to the OAM state machine of the first other node to a parameter specified according to the OAM state machine of the second other node.

20. The method of claim 19, the method further comprising operating at a client layer using the same of the definitions end to end, while applying the translating and the using a respective transcoding state machine at an LSP layer to use different definitions at each end.

21. The method of claim 19, the method further comprising applying the translating and the using a respective transcoding state machine at both an LSP layer and a client layer to use different definitions at each end.

22. The method of claim 19, the method further comprising carrying out OAM PDU termination, followed by OAM PDU generation or suppression according to differences in periodicity of OAM PDUs in the different definitions.

23. The method of claim 19, the method further comprising using a mapping table to map between events that trigger state changes.

24. A non-transitory computer readable storage medium having a stored program which, when executed by a processor for controlling a node to exchange OAM information with one or more other nodes in a communications network where different OAM state machines each configured to operate according to a respective variant of MPLS are used by the node and the one or more other nodes, causes the processor to perform operations comprising:

mapping, using a superset state machine, states of one of the different OAM state machines into states recognised by another of the different OAM state machines, exchanging the OAM information between the node and the one or more other nodes according to states of one of the different OAM state machines and according to states mapped from another of the different OAM state machines, to support a path for data traffic between the node and the one or more other nodes, and modifying an OAM message from the node to the one or more other nodes by changing, in the OAM message, a parameter specified according to the OAM state machine of the node to a parameter specified according to the OAM state machine of the one or more other nodes.

* * * * *